No. 656,705. Patented Aug. 28, 1900.
C. W. WARNER.
SEED PLANTER.
(Application filed Oct. 12, 1898.)
(No Model.) 2 Sheets—Sheet 1.
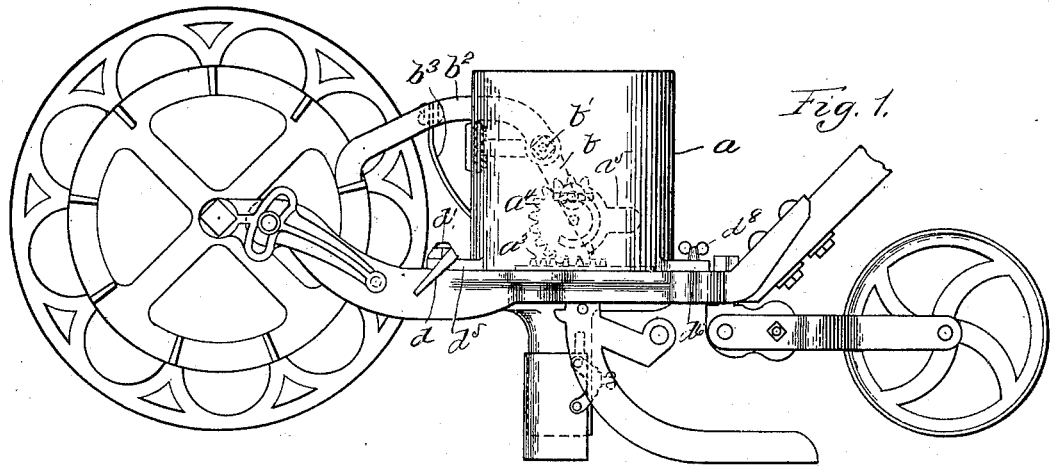
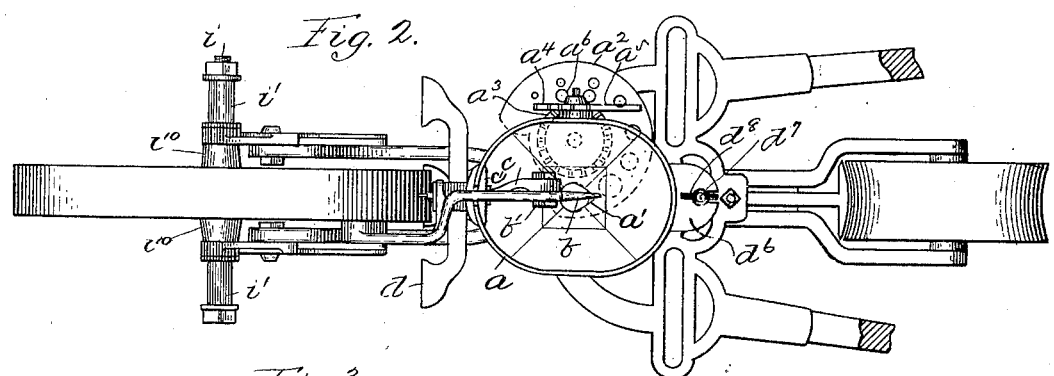
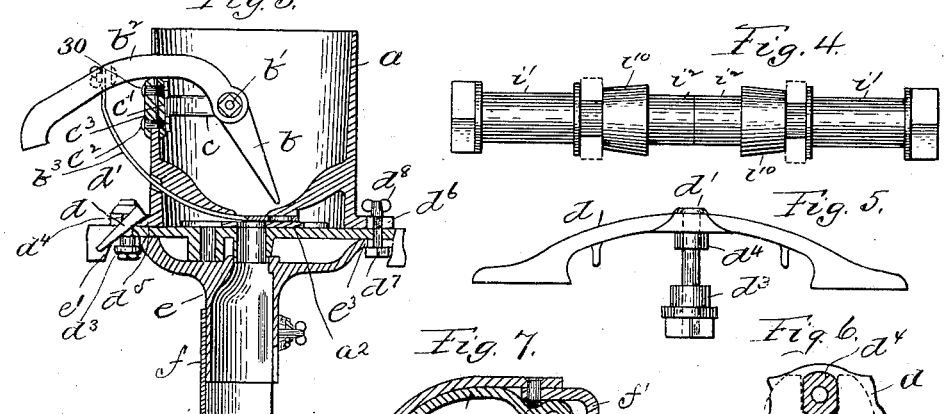
Witnesses:
H. B. Davis.
J. L. Hutchinson
Inventor:
Charles W. Warner
by B. Johzy es.
atty.
THE NORRIS PETERS CO., PHOTO-LITHO., WASHINGTON, D. C.

No. 656,705. Patented Aug. 28, 1900.
C. W. WARNER.
SEED PLANTER.
(Application filed Oct. 12, 1898.)
(No Model.) 2 Sheets—Sheet 2.
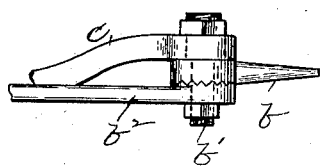
Fig. 8.
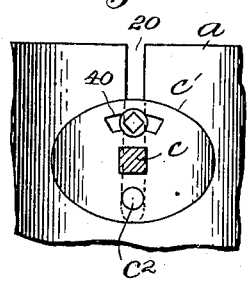
Fig. 9.
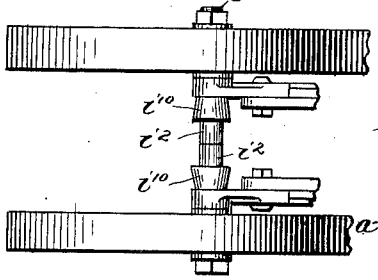
Fig. 13.
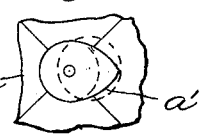
Fig. 10.
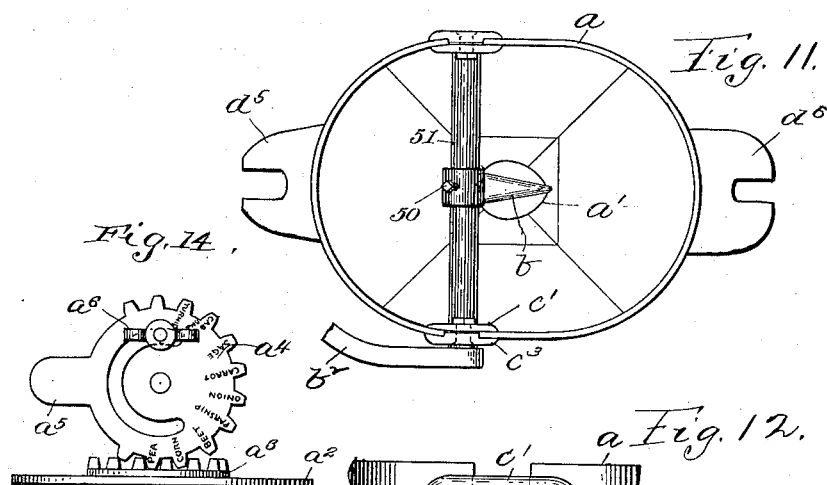
Fig. 11.
Fig. 14.
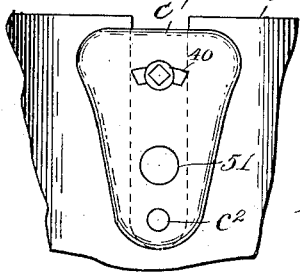
Fig. 12.
Witnesses:
H. B. Davis.
J. L. Hutchinson
Inventor:
Charles W. Warner,
by B. J. Hayes,
Atty

UNITED STATES PATENT OFFICE.

CHARLES W. WARNER, OF MELROSE, MASSACHUSETTS.

SEED-PLANTER.

SPECIFICATION forming part of Letters Patent No. 656,705, dated August 28, 1900.

Application filed October 12, 1898. Serial No. 693,329. (No model.)

*To all whom it may concern:*

Be it known I, CHARLES W. WARNER, of Melrose, county of Middlesex, State of Massachusetts, have invented an Improvement in Seed-Planters, of which the following description, in connection with the accompanying drawings, is a specification, like characters on the drawings representing like parts.

This invention relates to planters; and it has for its object to improve and simplify the construction of the same in several particulars, having special reference to the device for controlling the delivery of the seed from the hopper and also to providing for the easy removal of the hopper and seed-conducting shoe, whereby the apparatus may be adapted for use as a cultivator by the application thereto of the usual cultivator-teeth.

In accordance with this invention the seed-hopper has an egg-shaped exit, and a feed-regulating plate is pivoted to turn beneath said hopper, having a number of holes through it of different sizes, any one of which may be brought into position beneath the egg-shaped exit, and means are provided for turning said perforated feed-regulating plate to bring any one of the holes into any position relative to said exit, to thereby present an opening for the delivery of the seed which will be the full size of the hole in said plate or which will be of any less dimensions, (being a portion or part of any one of said holes,) and means are provided for securing said perforated feed-regulating plate in whatever position it may be set.

Heretofore the perforated feed-regulating plate, which is located beneath the hopper and which is provided with a number of different-sized holes, has been turned regular or predetermined distances to bring any one of the holes into correct position beneath the exit of the hopper, and thereby present a delivery-opening of a size corresponding to the size of the hole in the plate, and to vary the size of such opening additional devices have been provided; but herein the means employed for securing the perforated feed-regulating plate in position has the capability of holding said plate in any desired position relative to the exit of the seed-hopper.

The agitating-finger, which is contained in the seed-hopper, has its pivot located above and in front of the front edge of the exit, so that said finger may depend from its support and work to and fro from a point beginning at the front edge of the exit and ending some little distance back of the rear edge of said exit. In practice I find that an agitating-finger having such a movement to be the best suited for the purpose or function that it is intended to subserve. The support for the agitating-finger is preferably adjustable to different elevations and also laterally.

A scraper is provided for the ground-wheels, which is secured to the main frame by a bolt, and said bolt passes through the frame, and two shoulders are provided, one above and the other below the frame. The shoulder which is located above the frame may be formed on the under side of the scraper, and the shoulder which is located beneath the frame may be formed on the nut, yet it is immaterial whether the shoulders are so formed, so long as they are on the bolt to be held in place by it.

The seed-hopper, which is mounted on the frame, has at one side an open slotted ear which astrides the shoulder on the bolt, being held in position beneath the scraper and when so held is readily removable, and a perforated ear is provided at the opposite side of said hopper, and a bolt passes through the main frame and through the perforation of said ear for securing the said hopper in place, said bolt having on it a thumb-nut which may be easily removed to allow of the removal of the seed-hopper without disturbing adjoining parts. The seed-conducting shoe, which is located beneath the main frame, has also an open slotted ear at one side which astrides the shoulder on the bolt and has a perforated ear at the opposite side, which receives the bolt, which passes through the main frame and which has on it the thumb-nut, and when said bolt is removed for the removal of the seed-hopper the seed-conducting shoe will also be removed. The seed-conducting shoe is made with a telescopically sliding or adjustable end portion, whereby its length may be varied, and the means herein shown for holding said adjustable member in whatever position it may be set also constitutes a specific feature of this invention.

Figure 1 shows in side elevation a planter embodying this invention. Fig. 2 is a plan view of the planter shown in Fig. 1. Fig. 3 is a vertical section of the seed-hopper and seed-conducting shoe and means for holding said parts on the frame. Fig. 4 is a detail of the axle which is adapted to receive upon it the ground-wheels. Figs. 5 and 6 are details of the scraper-bar, showing particularly the shoulders which are engaged by the seed-hopper and seed-conducting shoe. Fig. 7 is a horizontal section of the seed-conducting shoe. Fig. 8 is a detail of the agitating-finger. Fig. 9 is an enlarged detail of the support for the agitating-finger, showing also a portion of the wall of the hopper to which it is attached. Fig. 10 is a detail showing the exit of the seed-hopper and a diagram of the perforated plate beneath it. Fig. 11 is a plan view of the seed-hopper containing a modified form of agitator to be referred to. Fig. 12 is an enlarged detail showing a portion of the wall of the hopper and one of the supports for the agitator. Fig. 13 is a detail showing the axle having thereon two ground-wheels. Fig. 14 is a detail of the toothed sector, having characters on it, which is provided for operating the feed-regulating plate.

The seed-hopper $a$, herein shown as oval in cross-section, is placed on the main frame and secured in place by means to be hereinafter described, and said hopper has its exit $a'$ made egg-shaped (see Figs. 2 and 10,) and beneath said seed-hopper a perforated feed-regulating plate $a^2$ is located, having a number of perforations of different sizes arranged concentrically on the plate and so disposed relative to the exit of the hopper as to be brought into position beneath said exit as the plate is turned. The feed-regulating plate has formed or provided on it a number of teeth $a^3$, also arranged concentrically to its pivot, and a sector $a^4$ is pivoted to one side wall of the hopper, the teeth of which engage said teeth $a^3$, so that as the sector is turned the feed-regulating plate will be correspondingly turned.

The sector $a^4$ has a finger-piece $a^5$ projecting from it for turning it. A thumb-screw $a^6$ passes through a curved slot in the sector (see dotted lines, Fig. 1) and into the side wall of the seed-hopper, which is employed as a means of securing said sector in whatever position it may be set. By providing a sector or any equivalent means for turning the feed-regulating plate, and a thumb-screw, as $a^6$, by which said sector may be secured in any different position, it will be seen that the feed-regulating plate may be moved as much or little as desired and may be securely held in whatever position it may be set. This sector may have formed on it any suitable characters to adapt it for use as an indicator, as represented in Fig. 14.

The largest hole of the series formed in the perforated plate $a^2$ is of substantially the same size as the largest circle which can be described in the egg-shaped exit $a'$, and when said hole is brought into position directly beneath said exit it will be seen that an opening the full size of said hole will be presented for the delivery of the seed; but by moving said perforated plate $a^2$ a short distance in a direction toward the small end of the egg-shaped hole the size of the opening for the escape of the seed will be very materially reduced. Thus the size of the opening for the delivery of the seed may be varied at will.

By providing an egg-shaped exit in the hopper the result above described may be readily accomplished, and the reduced openings will be more nearly circular in shape then if the exit of the hopper were made truly circular. By providing the feed-regulating plate $a^2$ with a number of different-sized holes, circular in shape, any one of which may be brought into any different position desired beneath an egg-shaped exit in the hopper, it will be seen that a delivery-opening more or less circular in shape can be obtained for the different kinds or sizes of seed, whereas if but a single hole is provided in said plate, which is made large enough for the large seed, it will be observed that when the size of the delivery-opening is reduced to a proper size for the small seed by adjustment of the plate the delivery-opening will be more or less triangular in shape, which is objectionable.

An agitating-finger $b$ (see Figs. 1, 3, and 8) is mounted on the pivot-bolt $b'$, which passes through a support $c$, and an arm $b^2$ is also mounted on said bolt, and said finger $b$ and arm $b^2$ are clamped together by the nut on said bolt. The contiguous faces of the finger and arm may be serrated to interlock, and the finger thus secured to the arm may be adjusted relatively thereto. The arm $b^2$ projects forward through a slot in the top of the front side wall of the hopper and is made of suitable length so that its forward extremity is brought into engagement with projections on the ground-wheel, and said arm $b^2$ serves as the actuating-arm for the agitating-finger. The bolt $b'$, which serves as the pivot for the agitating-finger and also as a means of adjustably connecting said finger to its actuating-arm, passes through a support $c$, as before stated, which is herein shown as an arm projecting more or less horizontally into the hopper and secured to or formed integral with a plate $c'$, (see Figs. 3 and 9,) and said plate $c'$ is adapted to bear against the inside of the front wall of the hopper and is located over a vertical slot 20, formed in said front wall of the hopper, and said plate $c'$ is pivotally connected to a plate $c^3$, located on the outside of the front wall of the hopper by means of a bolt $c^2$, passing through said plates. The outer plate $c^3$ has formed on its inner side a vertical rib which enters said vertical slot 20 and serves to hold it in an upright position. Another bolt 30 passes through a hole in the plate $c'$ and through a slot 40 in the plate $c^3$, which serves as a means of rigidly securing said plates together by clamping them to the hopper, and the slot 40 in the plate $c'$ is located above the pivot $c^2$ and curved concentrically to said pivot $c^2$ in order that said plate $c'$, bearing the arm $c$, may be adjusted relatively to the plate $c^3$ when the nut on the bolt 30, which passes through said curved slot 40, is loosened. Lateral adjustment of the agitating-finger relative to the exit is thus provided for.

The plate $c^3$ is capable of vertical adjustment in the vertical slot provided for it by loosening the nut on the aforesaid clamping-bolt 30, so that the support bearing the agitating-finger may be correspondingly adjusted to different elevations.

The support $c$ is made of suitable length so that the pivot of the agitating-finger will be located above but in front of the front edge of the exit of the hopper, thus permitting said finger to work to and fro from a point beginning at the front edge of the exit of the hopper to a point at the rear of the rear edge thereof. I find in practice that such movement produces more efficient results than if the finger worked beyond both edges of the exit—that is, in both directions.

In Fig. 11 the agitating-finger $b$ is secured by means of a set-screw 50 to a horizontal shaft 51, which is journaled in plates $c'$ $c^3$, adjustably secured to the opposite side walls of the hopper, said plates being made substantially the same as the plates $c'$ and $c^3$ (shown in Figs. 3 and 9) and capable of the same adjustments relative to the hopper, and in this modified form it will be seen that the finger $b$ may be adjusted on the shaft 51 by operating the set-screw 50 and also may be held in different elevations by vertical adjustment of the shaft 51.

$d$ represents a scraper-bar, which is secured to the main frame and is employed to scrape the ground-wheels, which are mounted upon the outer ends of the axle, as shown in Fig. 13, and said scraper-bar is secured to the main frame by a bolt $d'$, passing through it and through the frame, and said bolt has on it above the frame a shoulder $d^4$, formed with two opposite straight parallel sides, as shown in Fig. 6, and said bolt has on it below the frame a shoulder $d^3$, which may be likewise formed with two opposite straight parallel sides. The scraper-bar is secured to the main frame by said bolt $d'$, and when secured in place the shoulder $d^3$ bears against the under side of the main frame, and the shoulder $d^4$ bears against the upper side of said frame. The shoulder $d^4$ is herein shown as formed integral with the scraper-bar, and the shoulder $d^3$ is shown as formed integral with a nut on the bolt; but this is immaterial as long as said shoulders are disposed on the bolt $d'$, one above and the other below the frame.

The seed-hopper $a$ has at its front side, at the bottom, an open-slotted ear $d^5$, which astrides the shoulder $d^4$, being thereby held from lateral displacement, and said hopper has at its rear side, also at the bottom, a perforated ear $d^6$, which receives a bolt $d^7$, which passes up through the main frame, said bolt having on its upper screw-threaded end, which projects above said ear $d^6$, a thumb-nut $d^8$. The ear $d^6$ is preferably open-slotted, but not necessarily so formed, and hence is referred to as "perforated."

The seed-conducting shoe $e$, which is located beneath the main frame, has formed or provided at its front end contiguous the main frame an open-slotted ear $e'$, which astrides the shoulder $d^3$ on the bolt $d'$ and has at its rear end, contiguous the main frame, a perforated ear $e^3$, which receives the aforesaid bolt $d^7$. By removing the bolt $d^7$, which may be done by removing the thumb-nut $d^8$, the seed-hopper and conducting-shoe may both be readily removed without loosening the bolt $d'$, as the open-slotted ears $d^5$ and $e'$ merely astride the shoulders $d^3$ $d^4$ and are not held clamped in position by the bolt $d'$, and when said parts are removed the apparatus may be used as a cultivator by supplying the usual cultivator-teeth. It will therefore be seen that the seed-hopper and seed-conducting shoe and parts borne by them may be readily removed without the employment of a wrench or other tool.

The seed-conducting-shoe $e$ has a vertically-adjustable extension $f$, which is made of a shape to correspond with the shape of the shoe and to slide telescopically thereon to vary the length of the shoe and to hold said adjustable or movable member $f$ in different positions. A yoke or frame $f'$ is secured to said member $f$, which passes around the back side of the shoe $e$, and a set-screw $f^2$ passes through said yoke or frame, which impinges upon said shoe $e$ to thereby hold the member $f$ in place. The bolts or rivets by means of which the yoke or frame is secured to the member $f$ project inwardly a short distance, as at 2, Fig. 7, and enter and follow along in vertical grooves which are formed or provided in the sides of the shoe $e$.

$i$ represents the axle, which is made quite long to support either a middle ground-wheel, as shown in Figs. 1 and 2, or two end ground-wheels, as shown in Fig. 13, and said axle, as herein shown, (see Fig. 4,) has mounted upon it at each end a bushing $i'$, upon which the end ground-wheels will be mounted, and the two arms of the main frame, (see dotted lines, Fig. 4,) are placed next to said bushings to thereby hold the bushings in place. Between said arms a divided bushing $i^2$ is mounted on the axle, which receives upon it the middle ground-wheel, said divided bushing being held in proper position by the two arms of the frame. The axle $i$ is made as a bolt, having on it a head at one end and a nut at the other, so that it may be conveniently withdrawn whenever desired.

The divided bushing $i^2$ $i^2$ is made long enough to fill the space between the arms of the frame, and in order that one of the end ground-wheels may be employed as the middle ground-wheel whenever desired each part of said divided bushing has formed on it a boss $i^{10}$, adapted to bear against the hub of the wheel, it being observed that the distance between said bosses $i^{10}$ is the same as the length of either bushing $i'$.

The plate $b^3$ is attached to the actuating-arm $b^2$, which passes beneath the exit of the hopper and which is employed to open and close said exit, and said plate is shown as having a hole through it of a shape and size corresponding to the shape and size of the exit. The plate $b^3$, having a hole through it for controlling the delivery of the seed, moves in and out in a guideway provided for it beneath the exit of the hopper and said guideway is formed at the bottom of the hopper and extends a suitable distance at the rear side of the exit, and it is along this part of the guideway that the perforated end of the plate $b^3$ works. When the hole in the plate $b^3$ is in position for the delivery of seed from the hopper, it registers with the exit, and said plate $b^3$ is then moved rearwardly or inwardly to close said exit, and during such movement of the plate its perforated end portion passes to the rear of the exit, as shown in Fig. 3. The guideway at the rear of the exit is formed with imperforate top and bottom walls, so that any seed which may be carried rearwardly by the rearward movement of the plate will be retained in the opening of the plate, and thereby prevented from escaping until the plate has been again moved forward and the opening brought into proper position for the delivery of the seed.

I claim—

1. In a planter, a frame, a headed bolt secured thereto having on it a shoulder above the frame, a seed-hopper mounted on said frame, having at one side an open slotted ear which astrides said shoulder, and having at the opposite side an ear, and a bolt passing through said ear having on it a thumb-nut, substantially as described.

2. In a planter, a headed bolt passing through the frame having on it a shoulder above the frame, a seed-hopper mounted on the frame having at one side an open slotted ear which astrides said shoulder, and having at its opposite side a perforated ear, and a seed-conducting shoe located beneath said frame having an open slotted ear at one side which astrides said bolt and having a perforated ear at the opposite side, and a bolt passing through the frame and through the perforated ears on the seed-hopper and a seed-conducting shoe, substantially as described.

3. In a planter, a frame, a bolt secured to said frame having on it a shoulder located beneath the frame, a seed-conducting shoe located beneath said frame having an open-slotted ear at one side which astrides said shoulder and having a perforated ear at the opposite side, and a bolt passing through the perforation of said ear having on it a thumb-nut, substantially as described.

4. In a planter, a seed-hopper having an exit, a feed-regulating plate turning beneath said hopper having a number of different-sized holes through it adapted to be brought beneath the exit of the hopper, teeth formed on said plate and a pivoted sector engaging said teeth, substantially as described.

5. In a planter, a seed-hopper having an exit, a feed-regulating plate turning beneath said hopper having a number of differently-sized holes through it adapted to be brought beneath the exit of the hopper, teeth formed on said plate and a pivoted sector engaging said teeth having characters thereon adapting it to serve as an indicator, substantially as described.

6. In a planter, a seed-hopper having an exit, a perforated feed-regulating plate beneath said hopper, a pivoted sector engaging said plate having a slot, and a thumb-screw for holding said sector in any desired position to vary the size of the exit, substantially as described.

7. In a planter, a seed-hopper, an agitating-finger within it, a support therefor and means for securing said support to the side wall of the hopper and for adjusting it to different elevations, substantially as described.

8. In a planter, a seed-hopper, an agitating-finger within it, a support therefor adjustable to different elevations and also adjustable laterally, substantially as described.

9. In a planter, a seed-conducting shoe composed of two parts movable one with relation to the other to lengthen and shorten the shoe, and means for securing the movable member of said shoe in different positions consisting of a yoke or frame attached to said movable member having inwardly-projecting studs which follow in grooves formed in the stationary member and a set-screw passing through said yoke or frame which engages said stationary member, substantially as described.

10. In a planter, a frame having two arms, a long bolt passing through said arms, a divided bushing $i^2$, $i^2$ on said bolt between said arms and bushings $i'$ on the projecting ends of said bolt, substantially as described.

11. In a planter, a frame having two arms, a long bolt passing through said arms, a divided bushing $i^2$, $i^2$, on said bolt between said arms, each part of said divided bushing having on it a boss $i^{10}$, and bushings $i'$ on the projecting ends of said bolt, substantially as described.

12. In a planter, a seed-hopper having an exit, a plate $b^3$ attached to an actuating-lever for opening and closing said exit, said plate having a hole through it corresponding to the exit of the hopper, and a guideway in which said plate works extending beyond the rear of the exit and having imperforate top and bottom walls, substantially as described.

In testimony whereof I have signed my name to this specification in the presence of two subscribing witnesses.

CHARLES W. WARNER.

Witnesses:
 B. J. NOYES,
 J. L. HUTCHINSON.